United States Patent [19]

Dunne et al.

[11] 3,980,493
[45] Sept. 14, 1976

[54] METHOD AND APPARATUS FOR THE TREATMENT OF WHEAT FLOUR

[75] Inventors: Gerald J. Dunne, Baie d'Urfe; Thomas Walter Roberts, Thunder Bay, both of Canada

[73] Assignee: The Ogilvie Flour Mills Company, Limited, Montreal, Canada

[22] Filed: Apr. 8, 1975

[21] Appl. No.: 566,132

[52] U.S. Cl. .................................. 127/24; 127/25; 127/67
[51] Int. Cl.² ...................... C13L 1/00; C13L 1/02
[58] Field of Search .................... 127/24, 25, 67

[56] References Cited
UNITED STATES PATENTS

| | | | |
|---|---|---|---|
| 1,798,811 | 3/1931 | Riemann | 127/25 |
| 2,555,908 | 6/1951 | Edeskuty | 127/25 |
| 3,669,739 | 6/1972 | Plaven | 127/67 |
| R27,402 | 6/1972 | Plaven | 127/25 |

*Primary Examiner*—Morris O. Wolk
*Assistant Examiner*—Sidney Marantz
*Attorney, Agent, or Firm*—Christen & Sabol

[57] ABSTRACT

Apparatus for separating and recovering starch and gluten from wheat flour dough. It includes a known trough-like vessel having a semicircular, at least partly perforated bottom, dough treatment members mounted on a rotatable shaft extending longitudinally within the vessel, means for adding wash liquid to the vessel, means for withdrawing this wash liquid together with extracted starch via the perforations, means for introducing dough at one end of the vessel and means for discharging gluten at the opposite end. The treatment members are in the form of rotatable radial blades having angularly inclined faces adapted to lift and advance the dough along the vessel while substantially avoiding pressing the dough against the perforated bottom. The blades also have sharpened leading edges adapted to co-operate with fixed cutter bars extending transversely across the vessel. These rotatable blades lift the dough which is cut both by a scissors action between the rotatable and fixed blades and by a single knife action involving only the rotating blade to expose a fresh surface for contact with the wash liquid.

10 Claims, 6 Drawing Figures

U.S. Patent  Sept. 14, 1976  Sheet 5 of 5  3,980,493 ved and the attendant disadvantages is greatly reduced.

METHOD AND APPARATUS FOR THE TREATMENT OF WHEAT FLOUR

BACKGROUND OF THE INVENTION

1. Field of the Invention

This invention relates to a process and apparatus for the recovery of starch and gluten from a wheat-flour dough.

2. Description of the Prior Art

Starch has been traditionally produced by extraction from tubers and also from corn and rice by disintegrating the tubers or grain and then washing out the starch from the pulp on screens of various designs. The production of wheat starch, on the other hand, requires a totally different process. The reason for this is the rather special physical properties of wheat gluten. The gluten tends to swell during the mixing process of wheat flour with water and forms a network of a cellular pattern in which the gluten forms the cell wall and the starch fills the cells. The hydrated or swollen gluten is very elastic and this property is utilized when leavening the dough for bread baking. When the yeast converts some of the starch granules into alcohol, carbon dioxide is formed and expands the cells. The elastic gluten walls prevent the gas from escaping and a fluffy and easier digestible bread can be baked.

While this is obviously a very beneficial feature of wheat flour in terms of bread production, it is at the same time one of the most serious problems in the utilization of wheat flour for the production of starch. When separating the gluten and starch from the wheat dough, water is used as the vehicle for washing the starch away from the gluten and in the unwashed dough, the gluten is dispersed as a very thin network. While the starch particles have a definite size and shape, the gluten has neither of these characteristics. Wheat gluten is, however, very sticky, tough and plastic in relation to gluten particles from other flour sources, which property makes it possible to collect the wheat gluten in the form of gluten lumps on a screen while the starch is washed through the screen by means of a washing liquid.

The above characteristics of wheat flour dough mean that in the separation process two contradictory conditions must be taken into consideration. Thus, on the one hand, the washed gluten particles or strands should accumulate as quickly as possible in order that the gluten losses may be kept small, while on the other hand, the gluten network must be ruptured in order that starch granules embedded in this network will come into contact with the washing liquid. These contradictory conditions have necessitated labour consuming and very lengthy and expensive procedures while obtaining wheat starch of rather poor quality and yields.

Continuous processes have been developed which involve a quite complete dispersion of the dough in wash water and the recovery of the gluten on vibrating or rotating screens having a very fine mesh of 100 microns or finer. These screens obviously require much cleaning and maintenance and, due to the large screen area required, the contact between products and air is considerable, this resulting in undue and unhygienic bacterial action and breakdown especially of the gluten. Moreover, this system requires a comparatively "hard" type of flour.

A significant advance in the production of starch and gluten from wheat flour dough is the system described in Plaven U.S. Pat. No. 3,669,739 issued June 13, 1972. In that system a wheat flour dough is simultaneously mechanically treated and spray washed with a starch absorbing liquid, this liquid being quickly removed from the recovery region so as to prevent an undue buildup of wash liquid. The dough is subjected to repeated pinching, shredding and cutting actions by the disposition and use of improved scrapers, and spreading members revolving with a rotatable axle extending axially within a perforated semicircular trough-shaped treatment zone. The purpose of this is to break down the gluten network of the dough so that the starch can be washed out and the starch and reformed gluten lumps recovered in different regions.

While that system has many advantages, it also has some quite severe commercial disadvantages. One of the major disadvantages is that the lumps of dough are subjected to repeated and progressive steps of pushing and moving, pinching, cutting and shreading operations by a plurality of different axially spaced and circumferentially offset radially extending pushing paddles and cutting sabres, the latter members operating by pinching the dough lumps between the radially outermost edges thereof and the trough bottom. This pushing and pinching of the dough against the perforated screen by the action of the various treatment members tend to cause the dough to block the screen thereby decreasing the efficiency of the system.

It is the object of the present invention to overcome the above disadvantages of the prior art systems.

SUMMARY OF INVENTION

This object is achieved according to the present invention by treating the wheat flour dough in such a manner that fresh dough surfaces available for contacting wash water are created continuously by repeated cutting or slicing the dough at a location remote from the screen or perforate member. In this way, pressing of the dough against the screen as required by the prior art processes is substantially avoided and the attendant disadvantages, especially the tendency of the screen to become blocked by material being treated, is greatly reduced or even eliminated.

DETAILED DESCRIPTION OF THE INVENTION

The apparatus of the present invention has the usual basic features including a trough-like vessel having a substantially semicircular, at least partly perforated bottom, dough treatment members mounted on a rotatable shaft extending longitudinally within the vessel, means for adding washing liquid to the vessel, means for withdrawing this washing liquid together with extracted starch via the perforations, means for introducing dough in one end of the vessel and means for discharging gluten at the opposite end. This apparatus is characterized by improved treatment members in the form of rotatable radial blades having angularly inclined faces adapted to lift and advance the dough while substantially avoiding pressing of the dough against the perforated bottom. These blades are further characterized by having sharpened leading edges which are adapted to cooperate with fixed cutter bars extending transversely across the vessel. Thus, the dough is lifted by the rotatable blades and is sliced or cut by a scissors action between the rotatable blades and cutter bars to expose a fresh surface for contact with the washing liquid. Moreover, some lumps of dough which have been raised by the rotatable blades may slide down the sharpened leading edges thereof towards the shaft and as a consequence are sliced even further by the combined action of their own weight and the said sharpened edges.

This arrangement very clearly avoids the prior art problems of the dough being pressed against the perforated bottom, thereby clogging the perforations. Any system which relies upon a kind of shredding action for cutting and exposing new surfaces of dough for starch removal will result in some degree of pressing of the dough against the perforated bottom and the resultant clogging of the holes. It has been found that this problem can be avoided only by having the rotatable blades relatively well spaced from the perforated bottom and contouring the faces of these blades solely to lift and advance the dough. The present invention provides substantially no shredding action and a clean cutting action occurs remote from the perforated bottom at the fixed cutter blade and along the length of the rotating blades. This cutting action has the effect of exposing a very substantial area of dough for contact with the wash liquid to remove additional starch. By providing this very distinct cutting action, the working of the dough especially against the perforate member is decreased to a minimum while the exposure of fresh surfaces for removal of starch is maximized.

The present invention also includes a novel process for separating and recovering starch and gluten from wheat flour dough. According to this process, a substantially continuous flow of wheat flour dough is introduced into one end of an elongated treating zone having a substantially semicircular, at least partly perforated bottom. Within this zone the dough is subjected to repeated and progressive steps of lifting, cutting and moving operations by a plurality of rotating radial blades having angularly disposed faces to lift and advance the dough while substantially avoiding pressing of the dough against the perforated bottom. The cutting action is provided by means of sharp leading edges on the blades which co-operate with fixed cutter bars so that as the dough is being lifted and advanced, it is also being sliced or cut by a scissors action between the rotating blades and fixed cutter bars to expose a fresh surface. The rotating blades also provide fresh surfaces via a knife action brought about by raised lumps of dough returning to the trough by sliding along the sharp leading edges of the rotating blades during which the lumps are sliced by the combination of the sharpened edges and their own weight.

During the travel through the treating zone the dough is also continuously being contacted with a wash liquid for washing out and removing starch from the dough, which wash water then exits through the bottom perforations. It is, of course, most important to keep the perforations open so that the wash liquid can discharge without accumulating in the treating zone. Thus, if gluten lumps are moved along the treating zone while submerged in water, they will not have sufficient absorption power to catch and merge with small gluten particles suspended in the wash liquid.

DESCRIPTION OF THE PREFERRED EMBODIMENTS

Certain preferred embodiments of the invention are illustrated by the attached drawings, in which.

Figure 1:
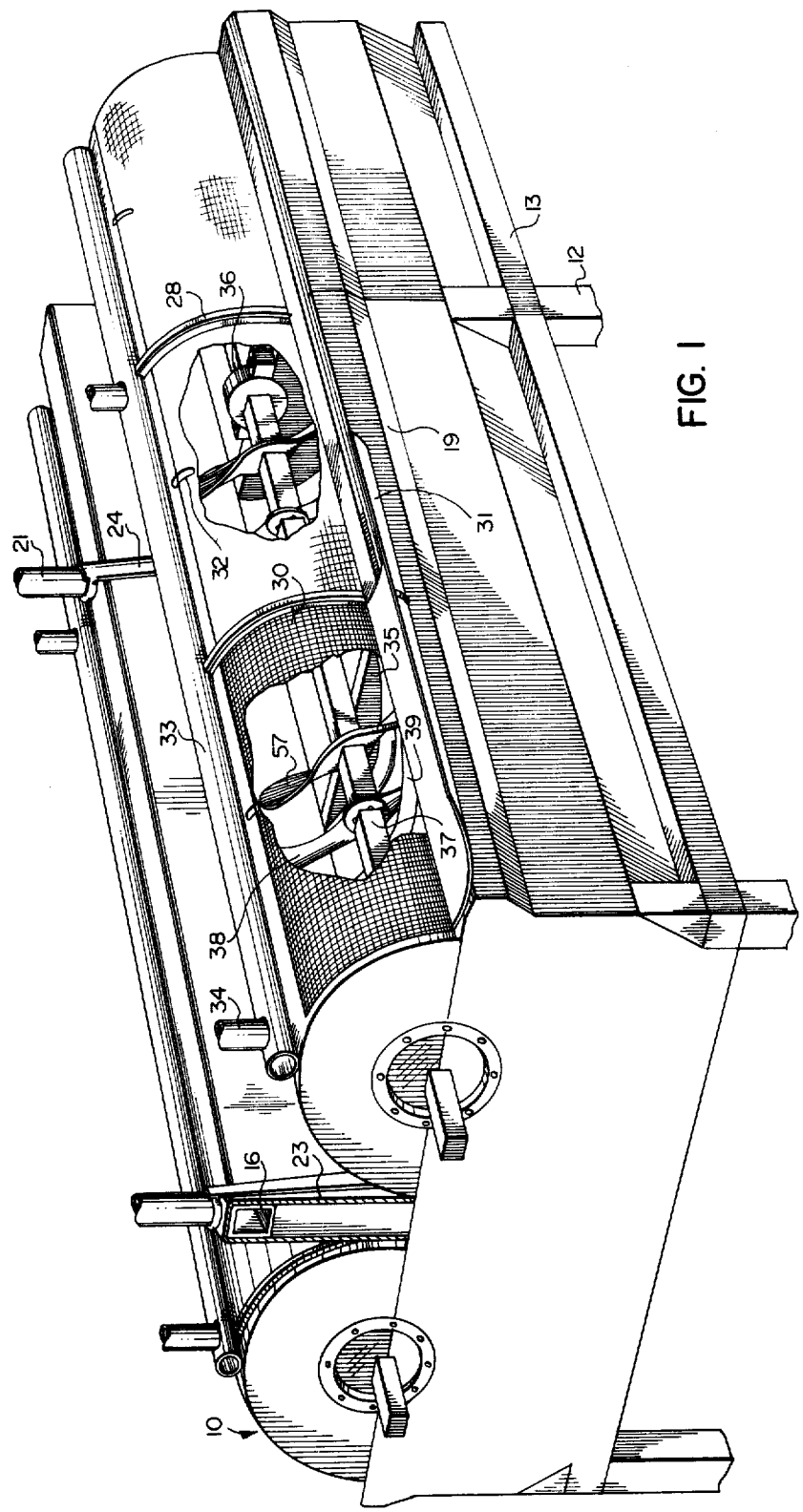
FIG. 1 is a general perspective view of the device of the invention.
Figure 2:
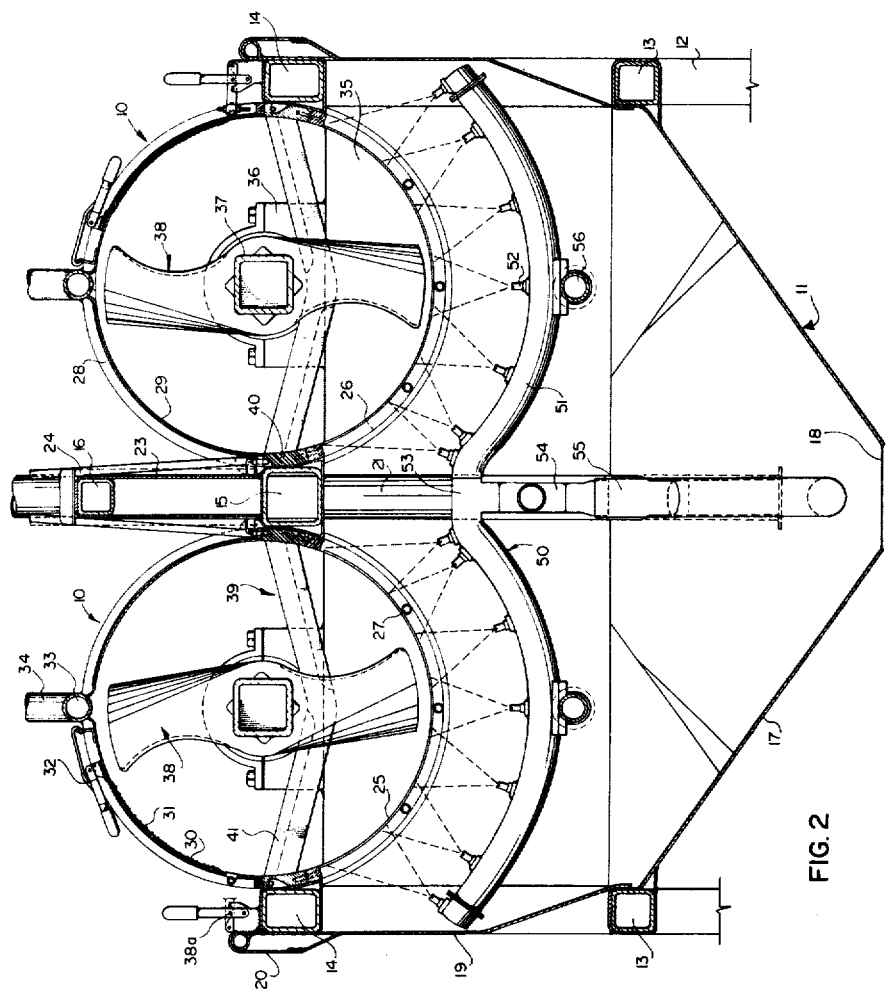
FIG. 2 is an end elevation in partial section.
Figure 3:
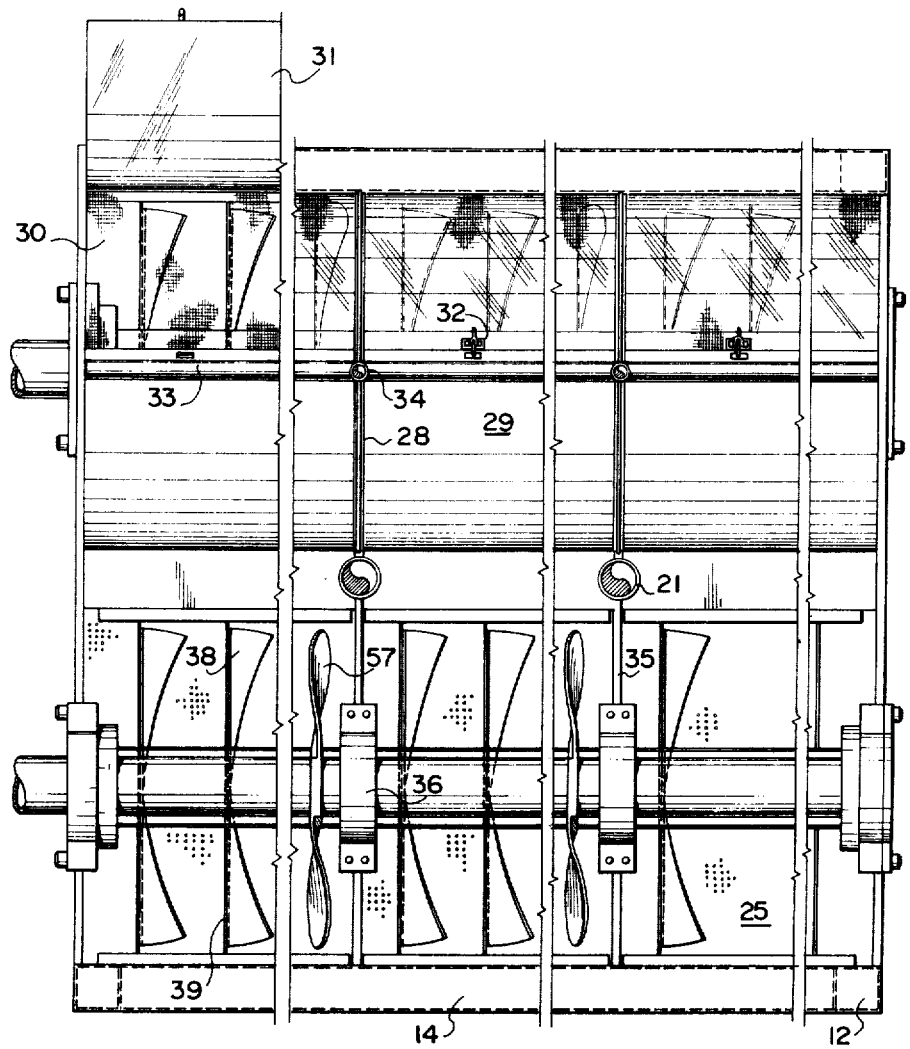
FIG. 3 is a plan view with portions of the cover removed.
Figure 4:
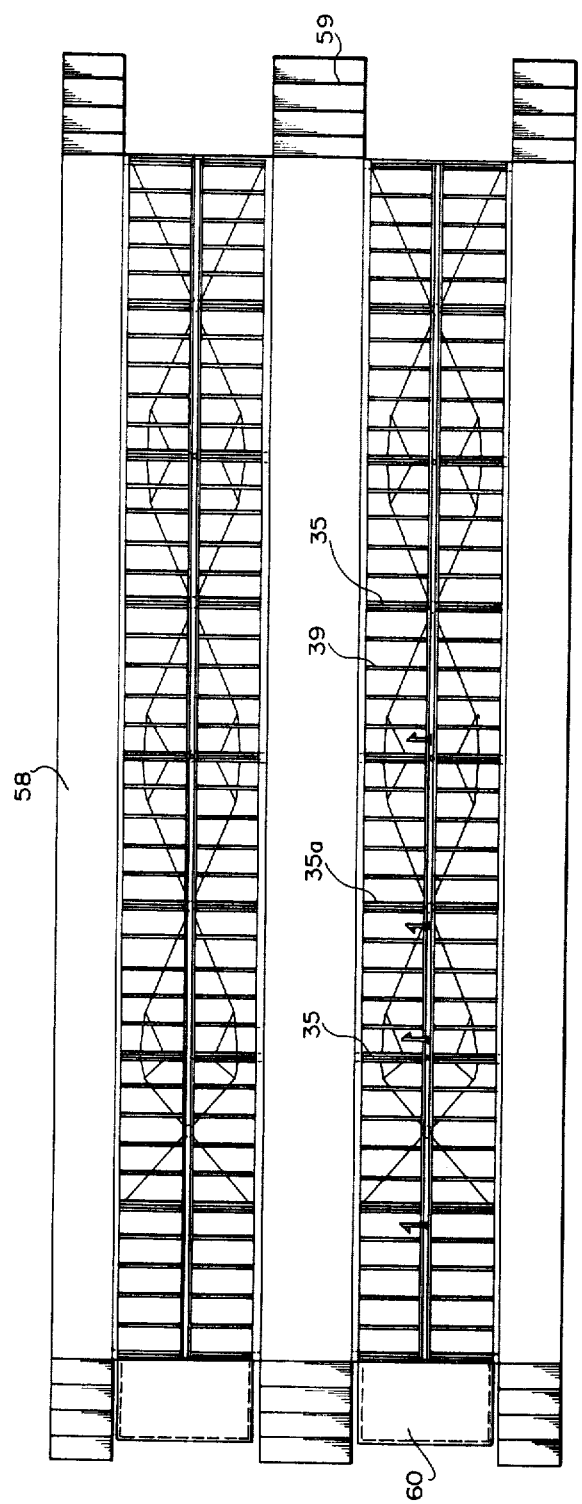
FIG. 4 is a plan view showing a complete commercial installation.

As will be seen from the drawings, the device primarily comprises elongated substantially cylindrical vessels or units 10 mounted in pairs with a common collecting trough or pan 11 for each pair of vessels 10. The vessels are supported by outer frames formed by lower horizontal frame members 13 and upper horizontal frame members 14 fixed between vertical posts 12. Between the pairs of vessels is a central support frame formed by horizontal frame members 15 and 16 fixed between vertical tubular members 21.

Figure 5:
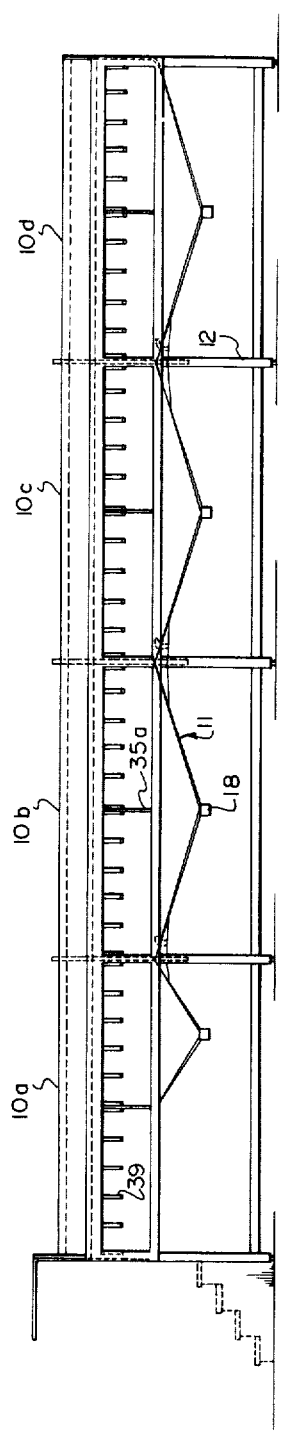
FIG. 5 is a side elevation of an industrial installation.
Figure 6:
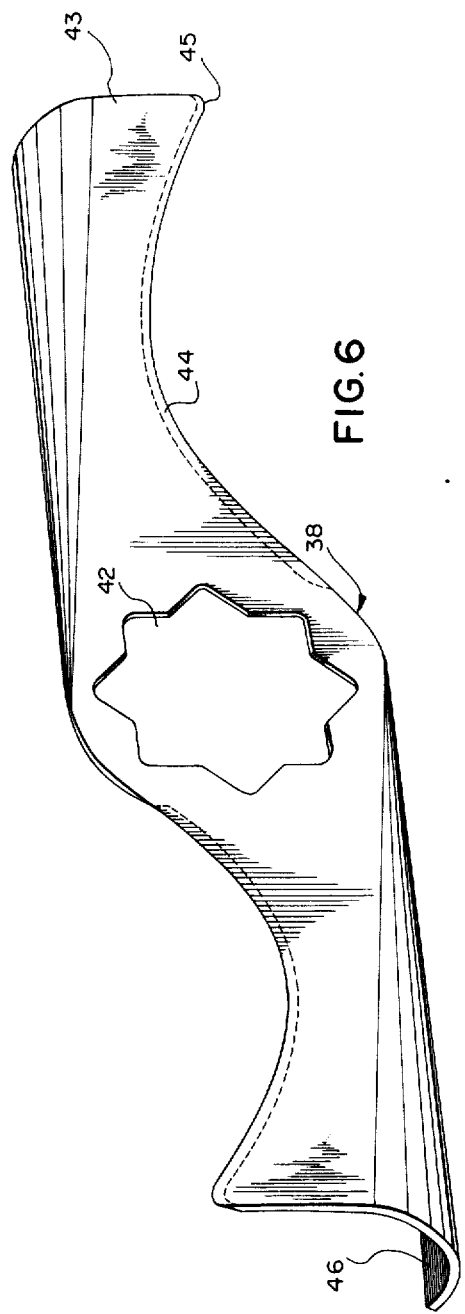
FIG. 6 is a perspective view of a rotatable blade.

Each vessel or unit 10 is in the form of a series of modules in end-to-end relationship and separated by low partition walls or dams. As shown in FIG. 5, each vessel 10 is made up of four modules 10a, 10b, 10c, and 10d of equal length. The support frame is also constructed in modules corresponding in length with the vessel modules.

The troughs or pans 11 are formed from stainless steel sheeting, each having lower incline panels 17 merging at a central outlet 18. The pans for vessel modules 10b, 10c, and 10d extend the full length of each vessel module, while for the first vessel module 10a the pan extends only under the second half of the vessel module. The first half of vessel module 10a is the dough receiving portion and does not have a perforated bottom. Extending upwardly from the lower panels 17 are removable side wall panels 19 which are hung from and held in place by panel hooks 20. The lower extremities of these side wall panels are retrained behind frame members 13. Thus, it will be seen that these side wall panels 19 can be very quickly and easily removed for cleaning purposes. A light gauge stainless steel panel 23 is wrapped around each upper central frame member 16 with the lower end edges of the panel 23 being welded to lower central frame member 15. This forms a pair of vertical panels extending longitudinally between vertical tubes 21 and forming back splash panels. Also in this central region are a pair of locking bars 24.

Each unit or vessel 10 has a semicircular perforated bottom 25. This perforated bottom is made up of stainless steel panels of the modular length. Each panel conveniently has a thickness of about 0.03 inch and the perforations can conveniently be of 0.025 inch diameter with a spacing of 0.05 inch. The units 10 are constructed with a series of longitudinally spaced semicircular T-shaped ribs 26 supported at their outer ends by frame members 14 and at their inner ends by frame member 15, with reinforcing tubes 27 running longitudinally between the ribs 26 for further stiffening. These ribs and reinforcing tubes are fixed in position and the perforated stainless steel panels are then mounted on top of the semicircular ribs and cemented in position to form the semicircular bottom. Thus, if any portion of the device becomes badly fouled or a perforated panel is damaged, a side wall panel 19 can be very quickly removed allowing access to the adjacent perforated bottom panel which can also be very quickly serviced or replaced by a new panel. This provides a great saving in down time of the device.

The top portions of the vessels 10 have further semi-circular T-cross section ribs 28 with one 90° segment of the top portion being enclosed by an arcuate stainless steel panel 29. An inspection window is also provided in the upper portion and this inspection window has a protective screen 30 and a plastic cover 31. The cover is held in position by means of clamp members 32 and 32a.

Extending along the length of the top of each vessel 10 is a header tube 33 with downwardly directed orifices. Wash water is sprayed into vessel 10 through this header. At the top of header 33 are a series of upwardly extending tubular connectors 34 which connect to flexible tubing for feeding in the wash water. This wash water may either be fresh water or water which is collected from the pans 11. For instance, the water collected from the pans of modules 10c and 10d may be sprayed into the top of vessel modules 10b and 10c.

The vessels 10 are divided into a series of compartments separated by low dams. These dams include radially positioned low partition walls 35 mounted between adjacent vessel modules and partition walls 35a mounted at the middle of each vessel module. The dams extend upwardly from the bottom of the vessel to a height of about two-thirds of the radius of the vessel.

Bearing members 36 are mounted at the ends of the modules directly above the dam members 35 and these bearings support for rotation a square tubular shaft 37. Mounted on this shaft 37 are a series of blade members 38. Also mounted within the vessels 10 are a series of fixed blades 39 for co-operation with the rotatable blades 38. The blades 39 are mounted at their ends in blade holding bars 40 and each blade 39 has a pair of cutting edges 41.

Each rotatable blade 38 has a flat front face 43 and a star-shaped central cut-out 42 for keying over the square shaft 37. These blades are spaced along the shaft by means of square spacers which slide over the square shaft 37. Thus, each modular length of the unit is assembled by sliding a series of blades 38 and square tubular spacers 47 onto a modular length of square shaft 37 and placing this in a vessel module.

Each blade 38 has a pair of diametrically opposed radial arms and each arm has a sharpened leading edge 44 of concave profile terminating in a projecting tip 45. The blades also have curvilinear trailing flange portions 46 which curve in a direction generally away from the flat face as shown. The combination of the curved cutting edge 44, the projecting tips 45 and the curved flanges 46 all work together to lift and cut the dough while substantially avoiding any pressing of the against the perforated bottom panels 25 and at the same time advancing the dough forwardly through the vessel over each dam 35.

It has also been found to be advantageous if a propellor shaped paddle 57 is positioned adjacent each dam 35. These paddles trail slightly the cutter blades and serve to deflect dough raised by the immediately adjacent cutter blade over the dam. These are mounted on the shaft in the same manner as the blades 38.

A backwashing header 50 may also be mounted for travel longitudinally along beneath the adjacent pair of vessels 10. This header has a pair of arcuate tubular members 51 with upwardly directed spray nozzles 52. These two tubes 51 are connected at their inner ends to a T-member 53 and this connects to a vertical tubular connector 54 onto which is connected a flexible sanitary hose 55. For travel along beneath the perforated bottom panels, the header tubes 51 are supported on horizontally extending shafts 56.

Backwashing of the perforated panels 25 can also very conveniently be done by simply removing the side panels 19 and spraying the perforated panels manually with hoses.

The embodiments of the invention in which an exclusive property or privilege is claimed are defined as follows:

1. In an apparatus for extracting starch and gluten from wheat flour dough, comprising an elongated treatment vessel having a substantially semicircular, at least partly perforated bottom, dough treatment members mounted on a rotatable shaft extending longitudinally within the vessel, means for adding wash liquid to the vessel, means for withdrawing this wash liquid together with extracted starch via the perforations, means for introducing dough at one end of the vessel and means for discharging gluten at an opposite end, the improvement which comprises treatment members in the form of rotatable radial blades having angularly disposed faces adapted to lift and advance the dough while substantially avoiding pressing of the dough against the perforated bottom, said blades also having sharpened leading edges adapted to co-operate with fixed cutter bars extending transversely across the vessel, whereby the dough is lifted by the rotatable blades and is cut by a scissors action between the rotatable blades and fixed bars to expose a fresh surface for contact with the wash liquid.

2. The apparatus according to claim 1 wherein said rotatable blades comprise a series of axially spaced blade members, each including a pair of diametrically opposed radial arms having a common flat leading face parallel to said fixed blades, with each radial arm having a sharpened leading edge and curvilinear trailing flange portion for lifting and advancing the dough.

3. The apparatus according to claim 2 wherein the sharpened leading edge is of concave configuration.

4. The apparatus according to claim 2, wherein said rotatable shaft is of rectangular cross-section and said rotatable blades and paddles are positioned thereon by means of rectangular spacer sleeves.

5. The apparatus according to claim 1 wherein the vessel includes low radial partition means to divide the vessel into predetermined zones.

6. The apparatus according to claim 5 wherein a paddle member is mounted on said rotatable shaft immediately upstream of each partition means, each said paddle member having radial blades angularly pitched relative to said shaft to deflect the dough over the partition means into the next zone.

7. The apparatus according to claim 6 wherein said rotatable shaft is of rectangular cross-section and said rotatable blades and paddles are positioned thereon by means of rectangular spacer sleeves.

8. A process for separating and recovering starch and gluten from wheat flour dough which comprises the steps of:
   introducing a substantially continuous flow of wheat flour dough into one end of an elongated treating zone having a substantially semicircular, at least partly perforated bottom, subjecting said dough to repeated and progressive steps of lifting, cutting and moving operations by a plurality of rotating radial blades having angularly disposed faces to lift and advance the dough while substantially avoiding pressing of the dough against the perforated bottom, the cutting operation occuring at a location remote from the perforated bottom and being provided by means of sharp leading edges on the blades which co-operate with fixed cutter bars so that as the dough is being lifted and advanced, it is also being cut by a scissors action between the rotating blades and fixed cutter bars to expose a fresh surface, introducing a wash liquid into and along said treatment zone for washing out and removing starch from the dough and removing said liquid with contained starch particles from the treating zone through the bottom perforations without forming any substantial wash water level in the treating zone, and extracting gluten from another end of said treating zone.

9. The process according to claim 8 wherein the elongated treating zone is divided into a plurality of successive subzones and the wheat flour dough is introduced into a first subzone, transferred through successive subzones and separated gluten extracted from a final subzone.

10. The process according to claim 9 wherein wash water extracted from the subzones is recycled in a countercurrent manner to the direction of travel of the dough.

* * * * *